July 29, 1958     C. M. McCOY     2,845,315
UTILITY SHELF FOR AN AUTOMOBILE INSTRUMENT PANEL
Filed March 18, 1957     2 Sheets-Sheet 1
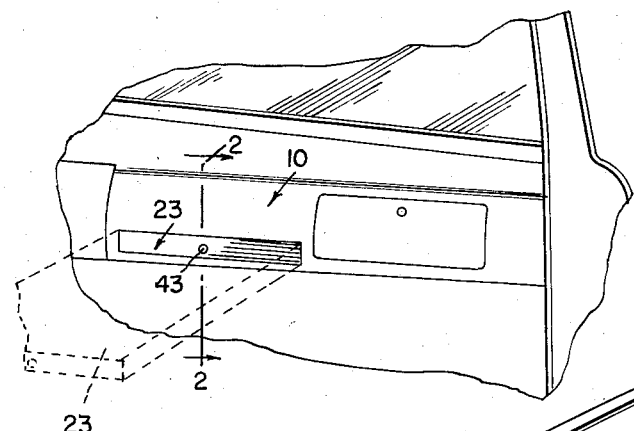
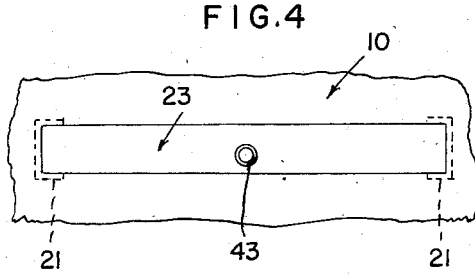
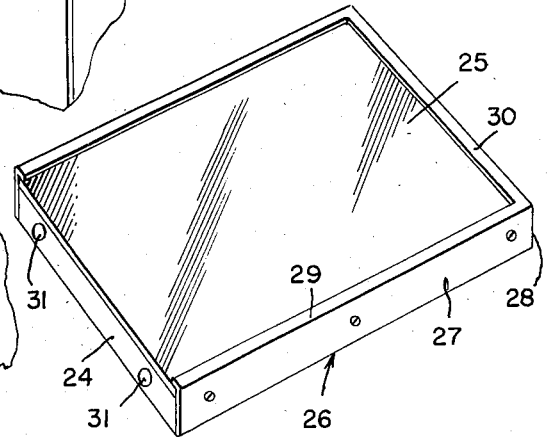
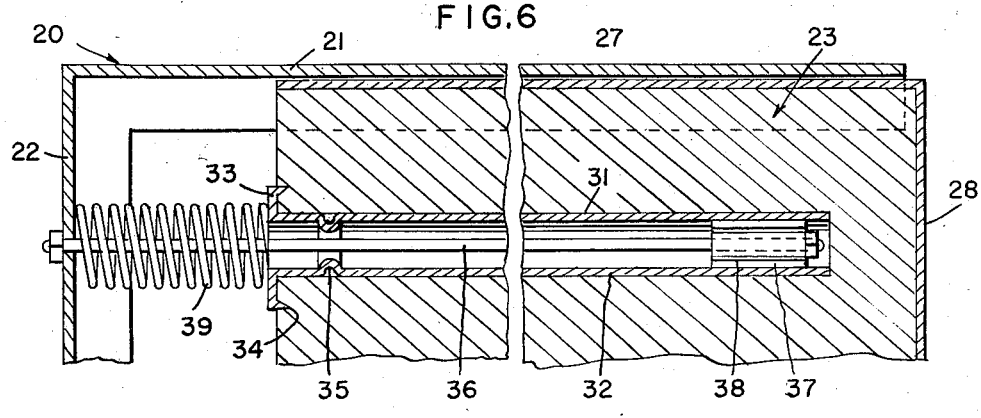
INVENTOR.
Charles M. McCoy
BY
Shoemaker & Mattare
ATTYS July 29, 1958     C. M. McCOY     2,845,315
UTILITY SHELF FOR AN AUTOMOBILE INSTRUMENT PANEL
Filed March 18, 1957     2 Sheets-Sheet 2
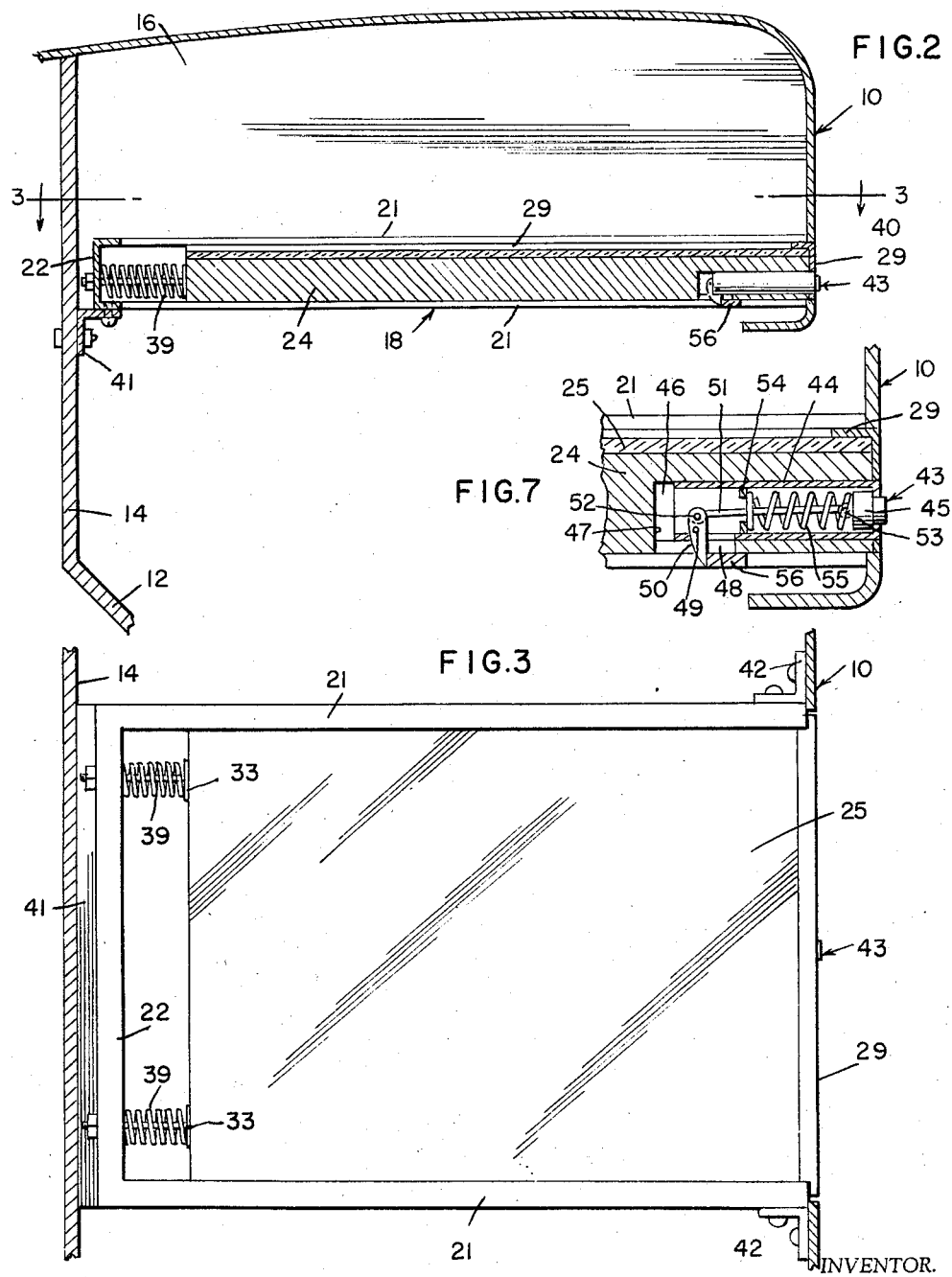
INVENTOR.
Charles M. McCoy
BY
Shoemaker & Mattare
ATTYS

United States Patent Office 2,845,315
Patented July 29, 1958

2,845,315

UTILITY SHELF FOR AN AUTOMOBILE INSTRUMENT PANEL

Charles M. McCoy, Prestonsburg, Ky.

Application March 18, 1957, Serial No. 646,683

5 Claims. (Cl. 311—21)

This invention relates generally to accessories for automobiles and is directed particularly to an improved shelf or leaf for attachment to the instrument panel of the motor vehicle for use as a support.

The need is frequently had for a support in the nature of a shelf or table in the front part of a motor vehicle for use by occupants of the front seat. For example, in parking next a drive-in resturant or when picnicking or traveling, the occupants of the motor vehicle frequently like to eat and enjoy a glass of refreshment and accordingly, particularly if it is not convenient to leave the vehicle, an accessory such as a shelf or leaf upon which to place articles is a very desirable feature and enables the occupants to eat and drink in comfort.

Accordingly it is an object of the present invention to provide an improved utility leaf or shelf construction which can be easily installed in the front part of the motor vehicle to be stored behind the instrument panel and drawn out or extended from the panel when desired for use.

It is another object of the present invention to provide a utility leaf or shelf which is held in place by a releasable latch means and which has incorporated in its structure spring units which are maintained under compression when the leaf is stored away or not in use and which act to project the leaf forwardly into a position of use when the holding latch is released.

A further object of the invention is to provide a utility leaf which is so designed that it can be made strong and durable and thus may be used as a writing desk or for the support of a typewriter and thereby become a very desirable accessory for use by traveling salesmen or business men.

A still further object of the invention is to provide a utility leaf of the character described having a glass top which may be used as a convenient means for holding in position a road map or other printed material where it can be easily and quickly consulted during the use of the vehicle in which the device is installed.

Other objects and advantages of the invention will become apparent as the description of the same proceeds and the invention will be best understood from a consideration of the following detail description taken in connection with the accompanying drawings forming part of the specification, with the understanding, however, that the invention is not confined to a strict conformity with the showing of the drawing but may be changed or modified so long as such changes or modifications mark no material departure from the salient features of the invention as expressed in the appended claims.

In the drawings:

Fig. 1 is a view in perspective of a portion of a motor vehicle instrument panel showing one position in which the utility shelf of the present invention may be located in connection therewith;

Fig. 2 is a sectional view taken in a vertical plane substantially on the line 2—2 of Fig. 1 and on an enlarged scale;

Fig. 3 is a horizontal section taken substantially on the line 3—3 of Fig. 2;

Fig. 4 is a front view of the leaf panel and adjacent portions of the instrument panel showing in dotted outlines the side members of the support frame which is behind the instrument panel;

Fig. 5 is a view in perspective of the shelf panel per se;

Fig. 6 is an enlarged horizontal section through one side of the shelf panel and the supporting frame, showing the guide tube in position in the shelf panel;

Fig. 7 is an enlarged sectional view taken in the vertical plane through the latch mechanism and adjacent portions of the structure supporting the same.

Referring now more particularly to the drawings, the numeral 10 generally designates an instrument panel of a motor vehicle which is disposed above the toe board of the floor of the vehicle, while the numeral 14 designates the conventional metal fire wall which extends upwardly from the forward part of the toe board and is in spaced relation with the instrument panel thereby providing an area 16 in which various elements of the motor vehicle electrical system and other parts of the vehicle are housed and it will also be apparent that in this area 16 is usually located the conventional glove compartment and radio.

The improved utility leaf or shelf structure of the present invention is generally designated 18 and is mounted, as hereinafter described, to extend between the instrument panel and the wall 14.

The unit 18 comprises a rectangular frame generally designated 20 and this frame is formed of side channel iron members 21 and a back channel member 22 which connects the inner or back ends of the side members 21 while the forward end of the frame is open.

The side members 21 of the frame 20 are arranged with the channels directed inwardly and function as tracks or guides for the hereinafter described panel.

Slidably positioned in the frame 20 for rectilinear movement between the guides 21 is a panel or leaf which is generally designated 23. This leaf embodies a board 24, of wood or other suitable material, having upon the top thereof a cover sheet or plate 25 of glass. Enclosing the panel along the sides and across the front is a trim frame which is generally designated 26 which comprises the side portions 27 and the cross front portion 28 which lie against the sides and forward end of the board 24 and the glass plate 25 and these side and front end portions 27 and 28 have the narrow inturned flanges 29 and 30, respectively, which extend over the top of the glass plate and thus hold the latter firmly in place. The trim frame 26 for the leaf or panel 23 is preferably of chrome metal and the face of the transverse front portion 28 may be suitably finished to match the finish of the instrument panel of the vehicle in association with which the leaf unit is used.

It is preferred that the panel 24 consist of hard wood and this panel has formed longitudinally therein adjacent to each side, a long bore 31 which opens through the back end face of the board as illustrated.

The bores 31 are of substantial length, preferably about 12 inches, and while the leaf 23 may be of any desired length according to the dimensions of the motor vehicle in which it is to be installed, it is found in practice that a length of approximately 15 inches is satisfactory.

Within each bore 31 is fitted a tube 32 at the back end of which is formed an encircling flange 33 which in turn is formed with downturned spurs or prongs 34 which are directed toward the opposite end of the tube and which, when the tube is extended into its bore 31, may be driven into the wood panel so as to firmly secure the tube in position.

Adjacent to the back end or flanged end of the tube 32, the tube is constricted slightly to form the inside annular rib 35.

The numeral 36 designates a rod which extends longitudinally through each tube 32 to the inner end of which rod is fixed a runner head 37 which snugly fits in the tube but is sufficiently free to have sliding movement therein. This head may be fluted or channeled, if desired, as indicated at 38, to facilitate its in and out movement without restriction due to compression of air between the inner end of the bore, or the possible production of a partial vacuum, in the space between the head and the inner end of the bore, as might be the result if the head were cylindrical and fitted snugly in the tube.

The rear end of the rod in each tube 32 is fixed to the cross member 22 of the channel guide frame 20 and encircling the rod and interposed between the cross member 22 and the rear end of the leaf 23 is a coil spring 39. These springs are placed under compression when the leaf 23 is pushed inwardly in the channel guide frame as will be readily apparent, and consequently when the leaf is released after the springs have been thus compressed, they will react to project the leaf forwardly in the guide frame and through the open forward end thereof.

By the provision of the constriction forming the annular rib 35 near the back end of each tube, the forward movement of the leaf will be checked by the engagement of the head with this rib so that the leaf will not be projected entirely out of the frame.

The utility structure is mounted between the instrument panel 10 and the wall 14, as illustrated in Fig. 2, and for this there is formed in the instrument panel an opening or slot 40 in alignment with which the channel guide frame will be positioned with the back end of the same in close proximity to or against the wall 14 and this back end of the frame may be secured to the wall 14 in any suitable manner, as for example, by the employment of an angle bar bracket 41 having one flange secured to the wall 14 and the other flange secured to the under side of the cross member 22 of the channel guide frame.

At the front of the channel guide frame the side members 21 may be attached to the rear side of the instrument panel in a suitable manner, such as by the employment of the angle members 42, and as will be readily obvious, the length of the channel guide frame will be such that when it is mounted in position, the forward ends of the side members 21 will abut the rear side of the instrument panel, the width and height of the opening corresponding to the width and vertical thickness of the leaf so that when the leaf is in position, only the front or forward end will show.

To maintain or hold the leaf in its retracted position in the guide frame with the springs 39 under compression, there is provided a finger actuated latch unit which is generally designated 43. While any suitable latch may be employed for this purpose, that here illustrated comprises a cylinder or barrel 44 which is countersunk in the front edge of the board 24 of the panel and which houses a push button 45 which is accessible through the open forward end of the barrel.

The countersink is in the form of a short bore or passage 46 formed in the forward end of the board to receive the barrel 44 and having at its rear end an opening 47 which extends through the bottom side or under face of the board. The barrel 44 also has an opening or slot 48 in the wall thereof adjacent to its inner end and which is aligned with the opening 47.

Adjacent to the rear or inner end of the barrel is a pivot pin 49 which extends across the width of the barrel and lies above the opening 48 and this pivot pin extends through and suspends the latching finger 50 which projects downwardly through the openings 47 and 48 and for a slight distance below the under face of the board 24.

The numeral 51 designates a plunger rod which is pivoted at one end to the latch finger 50, as indicated at 52, above the pivot 49 and extends forwardly to and is pivotally coupled with the button 45, as indicated at 53.

Interposed between the button 45 and suitable holding means or stops 54 located in the barrel forwardly of the opening 48 is a coil spring 55 which is constantly under some tension or compression and urges a forward or outward movement of the button 45 as will be readily apparent. Also this spring, by its engagement against the button, and because of the connection between the button and the latch finger by the plunger 51, tends to swing the tip or lower end of the latch finger 50 rearwardly in the opening or slot 48. The slot 48 is of sufficient length to permit the latch finger 50 to swing forwardly when pressure is applied to the button 45 by the finger and this forward swinging of the tip of the latch finger is sufficient for the latch finger to clear a keeper which is designated 56 and is here shown as being in the form of a bar which extends transversely of and is connected to the bottom flanges of the side channel members 21 of the frame structure.

To effect the release of the sliding leaf so that the springs 39 can project the leaf forwardly, it is necessary to force the button 45 inwardly against the tension of the spring 55 and at the same time effect, by such pressure of the finger against the button, a slight rearward movement of the panel or leaf against the resistance of the operating springs 39. This will move the latch finger 50 backward away from the keeper bar 56 a sufficient distance to permit the finger to rotate on the pivot pin 49 so as to elevate the tip of the keeper finger above the bar 56. On completion of this action, it will be seen that the compressed springs 39 will then be permitted to force the leaf outwardly, the tip of the keeper finger sliding across the top of the bar 56.

Upon return movement of the leaf into the frame, it will be seen that the rounded back edge of the latch finger will ride across the top of the keeper bar 56 until the tip of the finger clears the back edge of the bar, whereupon the spring 55 will cause the finger to be snapped down to vertical position to engage behind the bar 56 to hold the leaf or panel in retracted position.

From the foregoing it will be seen that there is provided by the present invention a very desirable accessory for a motor vehicle and one which is strongly constructed so as to support a considerable weight, as for example, the weight of a typewriter or other piece of equipment which the occupant of the vehicle may desire to use. Also the novel association of the springs 39 with the sliding leaf or panel is such as to effect a smooth forward extension of the leaf or panel when it is desired for use, immediately upon the release of the latch finger 50 from engagement with the bar 56. The manner in which the guide rod 36 is suspended at its forward end in the tube 32 permits the movement of the leaf or panel relative to the rod without noise such as might be produced by vibration of the rod if the forward end were free in the tube rather than being supported by the head 37.

I claim:

1. In a utility shelf for an automobile instrument panel, the combination with an instrument panel spaced forwardly of the conventional fire wall and having an elongate horizontal rectangular opening therein, of a rectangular frame having elongate side channel members and a back channel member connecting the side members, the channels of said members being directed inwardly toward one another, the frame being open at its forward end, means securing the forward ends of the side members to the back of the instrument panel at opposite ends of said opening with the web portions of the channels between the flanges thereof having the inner surfaces substantially flush with the adjacent side edges of the opening, means securing the back panel to said fire wall, an elongate board leaf of substantial thickness slidable through said opening into the frame through the open forward end thereof, the leaf having opposing side edge portions slidably supported in the side channel members, said board leaf having a pair of tubular guide passages formed therein from the back edge thereof and extending forwardly through a substantial extent of the length of the leaf, guide rods fixed to the back channel member and each extending forwardly into a guide passage, coil spring means encircling each rod and interposed between the back channel and the back edge of the panel and compressed by and upon movement of the panel into the frame, and latching means between the panel and a part of the frame for releasably holding the panel in the frame against forward outward projection by the compressed springs.

2. The invention according to claim 1, with coacting elements carried by the panel and rods in said passages for limiting outward movement of the panel.

3. The invention according to claim 1, with a tube lining each passage and having a portion of the wall adjacent the back end thereof inpressed, and a member carried by the forward end of each rod for engagement with the adjacent inpressed portion of the tube for limiting outward movement of the panel.

4. The invention according to claim 3, wherein said member comprises a longitudinally fluted elongate runner head slidable in the tube and additionally functioning to support the inner end of the rod centrally in the tube.

5. The invention according to claim 1, wherein said latching means includes a pivoted latching finger having an end portion projecting beyond the under side of the leaf and the said part of the frame comprising a bar extending across between the lowermost flanges of the side channel members for engagement by said finger.

References Cited in the file of this patent
UNITED STATES PATENTS

| | | |
|---|---|---|
| 441,308 | Kenney | Nov. 25, 1890 |
| 2,161,275 | Betts | June 6, 1939 |
| 2,292,797 | Roberts | Aug. 11, 1942 |
| 2,322,755 | Voorhies | June 29, 1943 |
| 2,568,102 | Weiss | Sept. 18, 1951 |
| 2,733,109 | Dooley et al. | Jan. 31, 1956 |